United States Patent [19]
Sato et al.

[15] 3,638,556
[45] Feb. 1, 1972

[54] TOASTER

[72] Inventors: Hosei Sato, Nishinomiya; Katsuyuki Natsumeda, Shijonawate; Kaichi Murakami, Osaka, all of Japan

[73] Assignee: Matsushita Electric Industrial Co., Ltd., Kadoma-shi, Osaka, Japan

[22] Filed: Aug. 28, 1970

[21] Appl. No.: 67,960

[30] Foreign Application Priority Data

Sept. 2, 1969 Japan..................................44/70861

[52] U.S. Cl................................................................99/329
[51] Int. Cl.......................................................A47j 37/08
[58] Field of Search....................99/326, 327, 328, 329, 331, 99/334

[56] References Cited

UNITED STATES PATENTS 2,545,662 3/1951 Huck et al............................99/329 X
2,624,268 1/1953 Horuath..................................99/329
2,778,902 1/1957 Visos.................................99/329 X Primary Examiner—Billy J. Wilhite
Attorney—Stevens, Davis, Miller & Mosher

[57] ABSTRACT

A toaster so designed that when a slice of bread has been toasted, the end of the toasting operation is detected by a toasting detector and a weight is dropped by the motion of the toasting detector, so that a bread carrier frame latching mechanism is released by the dropping force of the weight, whereby the bread carrier frame is returned from a bread toasting or lower position to a bread removing or upper position.

6 Claims, 7 Drawing Figures

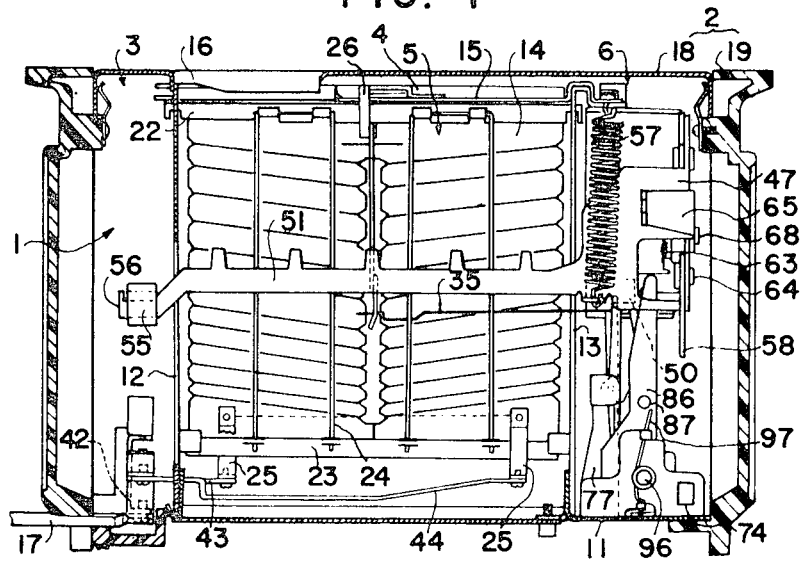
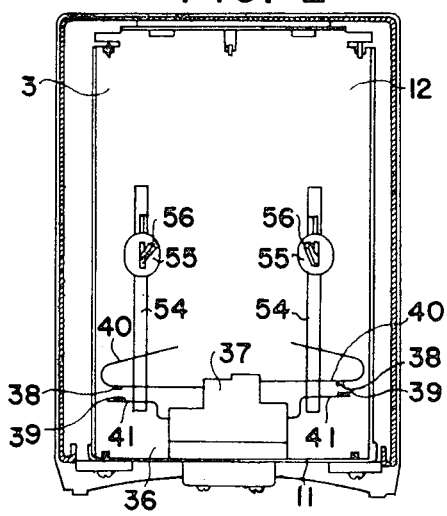
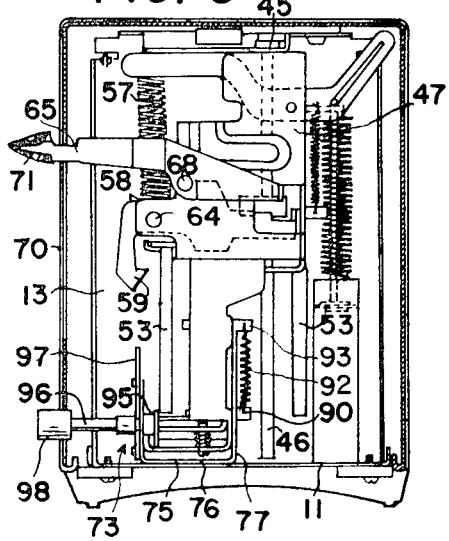

TOASTER

The present invention relates to a toaster.

The primary object of the invention is to provide a toaster of the type comprising a bimetallic element for detecting the temperature in the vicinity of the bread surface, which, for the purpose of obtaining a constant toasting effect at all times, is so constructed that a weight is dropped by the deflection of the bimetallic element to release a vertically movable plate, with a bread carrier frame mounted thereon, from its lower position, the force required for releasing said vertically movable plate and the force of deflection of said bimetallic element being dissociated from each other to reduce the reaction received by said bimetallic element.

Another object of the invention is to provide a toaster of the character described above, in which the force to release the weight from its latched position is uniformalized by making use of the force of deflection of said bimetallic element, whereby the toasting degree controlling effect of the bimetallic element is enhanced and a satisfactory bread toasting operation can be obtained.

The present invention will be described in detail hereinafter with reference to the accompanying drawings, in which:

FIG. 1 is a vertical cross-sectional view of an embodiment of the toaster according to the present invention;

FIG. 2 is a side view of the toaster, with a side panel thereof removed;

FIG. 3 is a side view similar to FIG. 2 but as viewed from the opposite side of FIG. 2;

Figure 4:
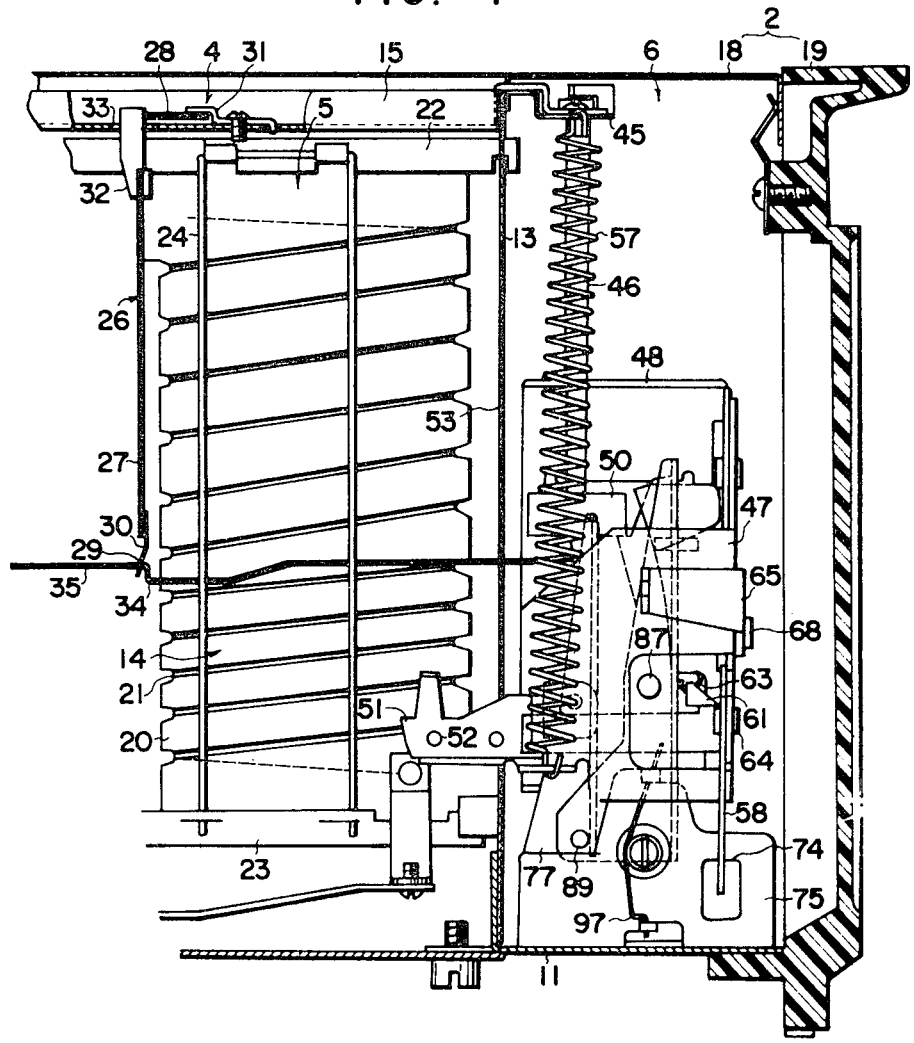
FIG. 4 is a fragmentary vertical cross-sectional view showing in an enlarged scale the right-hand portion of the toaster, with the bread carrier frame in its lower position.

A framework 1 comprises a base 11 and sideplates 12, 13 extending vertically from said base 11. Bread toasting heaters 14 are provided between the sideplates 12, 13 and above the central bread toasting heater 14 is extended a center plate 15 which constitutes part of the framework 1. The framework 1 is enclosed by an outer casing 2 which is composed of an outer central panel 18, with bread insertion slits 16 formed therein, and outer side panels 19. The outer casing 2 and the framework 1 define a switch compartment 3, a bimetallic element correcting compartment 4, a bread-toasting compartment 5 and an elevator mechanism compartment 6, which are separated from each other.

The bread-toasting heater 14 provided in the bread-toasting compartment 5 consists of an electric heating wire 21 wound around an insulating plate 20, such as an asbestos plate. The insulating plate 20 is provided with fitting strips 22, 23 at the upper and lower ends thereof and guide rods 24 are extended vertically with the opposite ends thereof connected to said fitting strips 22, 23 respectively, which serve as guides for a slice of bread when the slice of bread is inserted into the toasting compartment and carried up and down in said compartment. The insulating plate 20 is connected to each of the sideplates 12, 13 through the fitting strips 22, 23. The bread-toasting heaters 14 are connected at their lower ends to a shorting lead plate 25 respectively in parallel relation.

In the bimetallic element correcting compartment 4 is disposed a bread-toasting detector 26. The toasting detector 26, as shown in FIG. 4, includes a main bimetal 27 and an auxiliary bimetal 28. An auxiliary plate 30 with an aperture 29 provided therein is connected to the lower end of the main bimetal 27, while a bracket 31 is provided at one end of the auxiliary bimetal 28, and the upper end of the main bimetal 27 and the other end of the auxiliary bimetal 28 are fixedly connected to a coupling member 32, As shown in FIG. 4, the auxiliary bimetal 28 is positioned in the bimetallic element correcting compartment 4, with the coupling member 32 projecting into the bread-toasting compartment 5 through a slit 33 formed in the center plate 15, and the main bimetal 27 is positioned adjacent a plane including the guide rods 24 arranged in spaced relation. A pushing rod 35 having a stepped portion 34 formed at one end portion thereof for engagement with the auxiliary plate 30 is extended through the aperture 29 formed in said auxiliary plate 30, and the other end thereof is extended into the elevator mechanism compartment 6 through an aperture (not shown) formed in the sideplate 13.

In the switch compartment 3 is provided a switch element 36 which is mounted on the base 11. The switch element 36 comprises a switch baseplate 37 and a pair of contact plates 40, 41 connected to each side of said switch baseplate 37, said contact plates 40, 41 being provided thereon with contacts 38, 39 respectively. Power cord connecting terminal plates 42, 42 and feeder lead plates 43, 44 are connected to the connected ends of the respective contact plates 40, 40 and a power cord 17 is connected to the power cord connecting terminal plates 42. The feeder lead plates 43, 44 are extended through a through-hole (not shown) formed in the side plate 12 and connected to a shorting lead plate 25.

Figure 5:
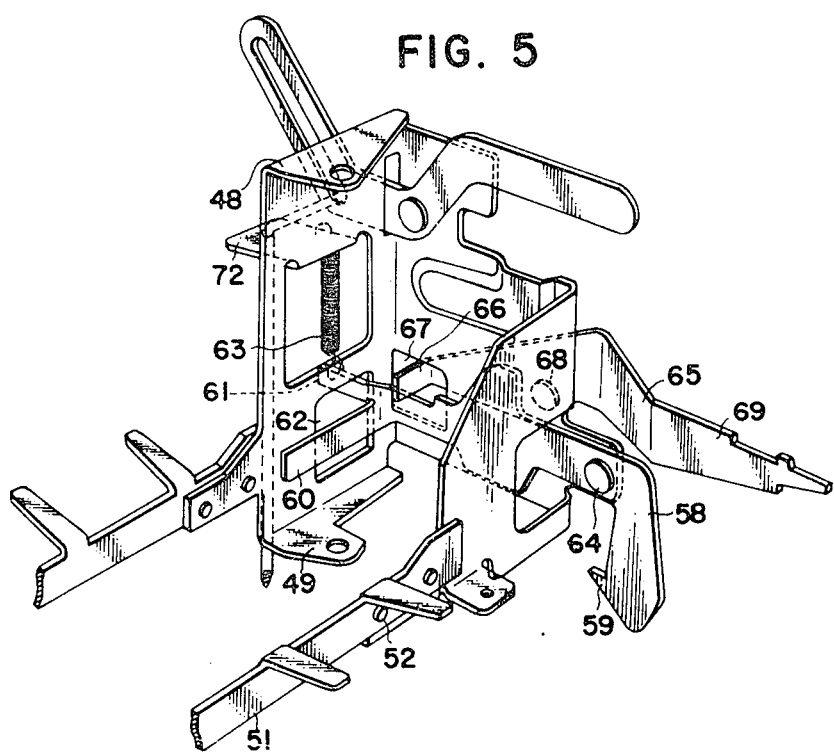
FIG. 5 is a perspective view of the vertically movable plate and some of the fittings thereof of the toaster.

In the elevator mechanism compartment 6 is disposed a guide post 46 which has the upper end connected to an extension 45 formed at the upper edge of the sideplate 13, with the lower end connected to the base 11. A vertically movable plate 47 is slidably mounted on the guide post 46, with said guide post 46 extending through holes formed in arms 48, 49 at the upper and lower ends of said vertically movable plate 47, as shown in FIG. 5. A disc-shaped weight 50 is slidably mounted on the guide post 46 between the arms 48, 49 of the vertically movable plate 47. This weight 50, as will be described later, serves to release the vertically movable plate 47 from its lower position when it is dropped upon completion of the toasting operation. Bread carrier frames 51 are secured to the vertically movable plate 47 by means of rivets 52. The bread carrier frames 51 extend into the bread-toasting compartment 5 through slits 53 formed in the sideplate 13 and further extend into the switch compartment 3 through slits 54 formed in the opposite sideplate 12. Switch pushing members 55, consisting of an insulating material, such as ceramics, resin or the like, are each provided at the free end of each arm of the bread carrier frames 51, and are each held in position by a stopper 56 formed at said free end. A spring 57 is extended between the vertically movable plate 47 and the upper edge of the sideplate 13, so as to constantly bias said vertically movable plate 47 upwardly. The vertically movable plate 47 also has a hook lever 58 and a manual operation lever 65 pivotally connected thereto. The hook lever 58 has formed at one end thereof with a hook 59 which is adapted to engage a latch 74 of a bread-toasting degree-adjusting mechanism 73 to be described later, to hold the vertically movable plate 47 in its lower position. The other end of the hook lever 59 is formed with bifurcated arms 60, 61. The arm 60 is positioned inside the vertically movable plate 47 and serves to support the weight 50 and also to limit a clockwise rotation, as viewed in FIG. 3, of the vertically movable plate 47 by engagement with the arm 49 of said vertically movable plate. The other arm 61 extends outwardly through a rectangular hole 62 formed in the vertically movable plate 47, and a spring 63 is extended between said arm 61 and an arm of said vertically movable plate 47 to bias the hook lever 58 to rotate in a counterclockwise direction. The counterclockwise rotation of the hook lever 58 is limited by the engagement between the arm 61 and the upper edge of the hole 62. The manual operation lever 65 is pivotally connected at its central portion to the vertically movable plate 47 by a pivot pin 68, with one end 66 thereof extending into the inside of said vertically movable plate through a hole 67 for engagement with an intermediate portion of the hook lever 58 between the arms 60, 61 and a pivot pin 64 by which said hook lever is pivotally connected to said vertically movable plate 47, to rotate said hook lever 58 against the biasing force of the spring 63. The other end 69 of the manual operation lever 65 is extended outwardly of the outer casing 2 through a slit 70 formed in said outer casing, and provided with a knob 71. When the knob 71 is pushed downward, the vertically movable plate 47 is lowered and the hook 59 of the hook lever 58 is brought into engagement with a latch 74 of the bread-toasting degree-adjusting mechanism 73 to hold said vertically movable plate 47 in its lower position. If, in this case, the manual operation lever 65 rotates in a counterclockwise direction, the vertically movable plate 47 cannot be moved downward, but since the rotation of the manual operation lever 65 is limited by the engagement with the upper edge of the hole 67 in the vertically movable plate 47, the vertically movable plate 47 moves downward smoothly. Where is is desired to move the vertically movable plate 47 upward by manual operation, the knob 71 is lightly pushed upward, whereby said manual operation lever 65 is rotated in a clockwise direction as viewed in FIG. 3 and pushes the hook lever 58, causing said hook lever to rotate in a clockwise direction, so that the hook 59 is disengaged from the latch 74 and the vertically movable plate 47 moves upwardly under the biasing force of the spring 57.

Figure 7:
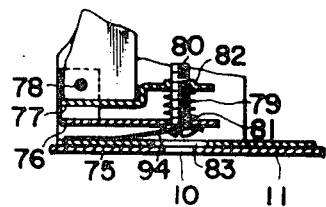
FIG. 7 is a fragmentary cross-sectional view illustrating the initial adjustment by the bread-toasting degree-adjusting mechanism of the toaster.

On the base 11 is also provide the bread-toasting degree-adjusting mechanism 73. The bread-toasting degree-adjusting mechanism 73 includes a baseplate 75 which is formed with the latch 74 for engagement with the hook 59 of the hook lever 58, and a first adjusting plate 76 and a second adjusting plate 77, which are pivotally connected to said baseplate 75 by means of a common pivot pin 78. The first adjusting plate 76 and the second adjusting plate 77 are connected by means of a bolt 80, and a spring 79 is mounted around said bolt 80 between said first and second adjusting plates 76, 77 so as to bias said plates in an opening direction. The bolt 80, as shown in FIG. 7, is inserted through a nonthreaded hole 81 in the first adjusting plate 76 from the underside and then threaded through an internally threaded hole 82 in the second adjusting plate 77. Thus, it will be seen that the first adjusting plate 76 is freely movable along the bolt 80 until its movement is limited by the head of said bolt. The baseplate 75 and the base 11 are formed with holes 83, 10 respectively at locations corresponding to the head of the bolt 80 so that the bolt 80 may be manipulated from the outside through said holes . The second adjusting plate 77 has a pressing plate 84 pivotally connected thereto by means of a pivot pin 85, and the top end of the pushing plate 84 is opposed by the pushing rod 35 through which a signal from the bread toasting detector 26 is transmitted. The bread-toasting degree-adjusting mechanism 73 further includes a weight receiving lever 86 which is pivotally connected to the base plate 75 by the pivot pin 87. The upper end of the weight receiving lever 86 is formed with a weight receiving portion 88 for receiving the weight 50, while the lower end thereof is provided with a pin 89 and an arm 90. The pin 89 is adapted to abut against the inside surface of the pressing plate 84. The arm 90 is projected through a hole 91 formed in the baseplate 75 and a spring 92 is extended between the baseplate 75 and the arm 90, as shown in FIG. 3, to constantly urge the weight receiving lever 86 to rotate in a counterclockwise direction as viewed in FIG. 1. The rotation of the weight receiving lever 86 is limited by the hole 91. The spring 92 is anchored to the baseplate 75 at a position 93 which is located slightly outwardly of the pivot pin 87, so that the weight receiving lever 86 may be rotated by a weak, substantially constant force. A leaf spring 94 is interposed between the first adjusting plate 76 and the base plate 75 to constantly urge said first adjusting plate to rotate in a counterclockwise direction as viewed in FIG. 1. A cam 95 is rotatably mounted on an adjusting shaft 96 journaled through the baseplate 75. The cam 95 is in engagement with the first adjusting plate 76, depressing said first adjusting plate 76 against the biasing force of the leaf spring 94. A spring 97 is provided which is pressure engagement with the adjusting shaft 96 to hold the latter against rotation. The adjusting shaft 96 is extended outwardly of the outer casing 2 and a knob 98 is mounted on the outwardly projecting end thereof. By manipulating the knob 98, the adjusting shaft 96 is rotated and a desired degree of toasting can be obtained. Namely, when the knob 98 is rotated, the first adjusting plate 76 and the second adjusting plate 77 are rotated integrally. As a result, the position of the pivot pin 85 is displaced about the contacting portion of the pushing plate 84 with the pin 89 of the weight receiving lever 86, at the lower end of said pushing plate 84 and thus the interval between the pushing rod 35 and the pushing plate 84 is changed, whereby the time when a deflection of the bread-toasting detector 26 is transmitted to the weight receiving lever 86 is adjusted. The bolt 80 is used to set the toaster at the manufacture's plant initially in such a manner that the knot 98 is positioned at the center of its rotational range when the toasting degree, preferred by the common users, is to be obtained.

Figure 6:
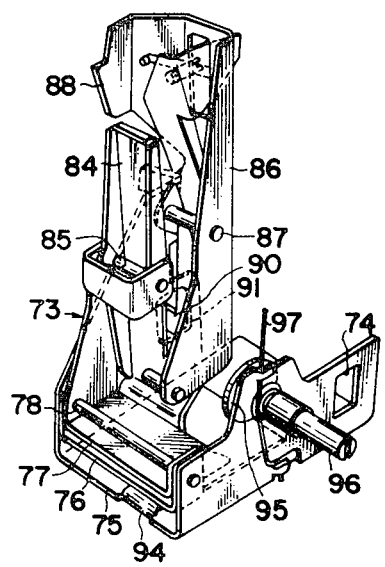
FIG. 6 is a perspective view of a bread-toasting degree-adjusting mechanism of the toaster.

Next, the operation of the vertically movable plate 47 and the bread-toasting operation will be described hereunder: First of all, the vertically movable plate 47, provided with the bread carrier frame 51, is lowered by pressing the knob 71 downwardly and held in the lower position by the engagement of the hook 59 of the hook lever 58 with the latch 74 of the bread-toasting degree-adjusting mechanism 73. In this case, the switch pushing members 55 at the free end of the bread carrier frame 51 depress the left and right contact plates 40, 40 to close the switch element 36. Thus, the bread-toasting heaters 14 are energized and a slice of bread on the bread carrier frame 51 is toasted by the heat of said bread-toasting heaters 14. As the toasting of the bread proceeds or the temperature in the vicinity of the bread rises, the main bimetal 27 is deflected. The auxiliary bimetal 28 is also deflected as the temperature of the outer casing 2 for the framework 1 rises. The pushing rod 35 is moved towards the pushing plate 84 by the total deflection of the main and auxiliary bimetals 27, 28, and causes the latter to rotate about the pivot pin 85 in a clockwise direction as viewed in FIGS. 1 and 6. As a result of the rotation, the lower end of the pushing plate 84 abuts against the pin 89 provided on the weight-receiving lever 86, causing said weight-receiving lever 86 to rotate. When the slice of bread has been toasted to a desired degree, the weight-receiving portion 88 of the weight-receiving lever 86 releases the weight 50, allowing the same to drop onto the arm 60 of the hook lever 58. Namely, according to the present invention the force required to release the vertically movable plate from its lower position and the force of deflection of the bimetallic element are dissociated from each other, whereby the reaction to be received by the bimetallic element is decreased and uniformalized. When the weight 50 drops, the hook lever 58 rotates against the biasing force of the spring 63 and the engagement between the hook 59 of said hook lever 58 and the latch 74 of the baseplate 75 is released, so that the vertically movable plate 47 is elevated to its upper position, together with the bread carrier frame 51, under the biasing force of the spring 57. In his case, the weight 50 is also moved upwardly with the vertically movable plate 47, since it rests on the arm 60 of the hook lever 58. In the elevated position of the weight 50, the underside of said weight 50 is located slightly above the weight-receiving portion 88 of the weight-receiving lever 86. Thus, the toaster is returned to the original position, preparing for the next cycle of bread-toasting operation. As will be understood from the foregoing description, the bimetallic element is only required to release the weight 50 and, therefore, the operation thereof becomes substantially constant.

Although the present invention has been described and illustrated herein in terms of a particular embodiment thereof, it is to be understood that the concept of the present invention can be applied to any and all toasters of the type which is so constructed that a weight withheld in its elevated position is released to drop by the operation of a bread-toasting control mechanism and a vertically movable plate latched in its lowered position is released therefrom by the dropping force of said weight and elevated upwardly under a force biasing said vertically movable plate upwardly.

What we claim is:

1. A toaster comprising a frame defining a bread-toasting compartment, heating means provided in said bread-toasting compartment, switching means to control the current supply to said heating element, vertically movable means urged upwardly and vertically movable between an upper position and a lower position, bread-carrying means connected to said vertically movable means for vertical movement therewith, means for lowering said vertically movable means against the biasing force urging said vertically movable means upwardly, latching means provided in the lower portion of said bread-toasting compartment for holding said vertically movable means in its lowered position against the biasing force, a weight provided for free dropping and normally being withheld in the upper portion, bread-toasting controlling means, means for releasing the withholding force for said weight when the completion of the bread-toasting operation has been detected by said bread-toasting controlling means, and means for releasing said latching means for said vertically movable means by the dropping force of said weight and moving said vertically movable means to the upper position.

2. A toaster comprising a frame defining a bread-toasting compartment, heating means provided in said bread-toasting compartment, switching means to control the current supply to said heating means, vertically movable means urged upwardly and vertically movable between an upper position and a lower position, bread-carrying means connected to said vertically movable means, an operating lever for lowering said vertically movable means against the biasing force urging said vertically movable means upwardly, a hook lever having a hook adapted to engage with a latch provided on said frame and hold said vertically movable means in its lowered position against said biasing force, a weight withheld in a position above said hook lever for free dropping therefrom, a weight-receiving lever for latching said weight, a guide post for guiding said weight in its dropping motion, a bread-toasting control mechanism including said weight-receiving lever and operating said weight-receiving lever when the bread-toasting operation has been completed, means for dropping the weight by operating the weight-receiving lever by the operation of said bread-toasting mechanism, and means for releasing the engagement between the hook of said hook lever and said latch by the dropping force of said weight and elevating said vertically movable member.

3. A toaster as defined in claim 2, wherein said hook lever is pivotally connected to the vertically movable member and said latch is formed on the frame.

4. A toaster as defined in claim 2, wherein said hook is formed on either one of said hook lever and said frame and said latch is formed on the other one.

5. A toaster as defined in claim 2, wherein said weight is slidably mounted on said guide post and one end of said hook lever is located adjacent said guide post, so that said weight may be dropped onto said hook lever.

6. A toaster as defined in claim 2, wherein said bread-toasting control mechanism comprises a bimetallic element, a pushing rod for transmitting the deflection of said bimetallic element, a pushing plate arranged in opposed relation to said pushing rod to be operated thereby, a supporting plate for rotatably supporting said pushing plate, a weight-receiving plate arranged in opposed relation to said pushing plate for receiving said weight, adjusting plates for adjusting the engaging position between said pushing plate and said weight-receiving plate, and adjusting means for adjusting the interval between said pushing rod and said pushing plate by changing the position of said supporting plate.

* * * * *